(12) United States Patent
Igarashi et al.

(10) Patent No.: US 11,917,485 B2
(45) Date of Patent: Feb. 27, 2024

(54) QUEUE MANAGEMENT DEVICE, QUEUE MANAGEMENT SYSTEM, QUEUE MANAGEMENT METHOD, AND COMPUTER-READABLE STORAGE MEDIUM

(71) Applicant: SHIMIZU CORPORATION, Tokyo (JP)

(72) Inventors: Yuya Igarashi, Tokyo (JP); Takashi Matsumoto, Tokyo (JP); Motoaki Yamazaki, Tokyo (JP); Michihito Shiraishi, Tokyo (JP)

(73) Assignee: Shimizu Corporation, Tokyo (JP)

( * ) Notice: Subject to any disclaimer, the term of this patent is extended or adjusted under 35 U.S.C. 154(b) by 409 days.

(21) Appl. No.: 17/292,854

(22) PCT Filed: Aug. 5, 2019

(86) PCT No.: PCT/JP2019/030642
§ 371 (c)(1),
(2) Date: May 11, 2021

(87) PCT Pub. No.: WO2020/100356
PCT Pub. Date: May 22, 2020

(65) Prior Publication Data
US 2021/0400433 A1 Dec. 23, 2021

(30) Foreign Application Priority Data
Nov. 15, 2018 (JP) ................................. 2018-214620

(51) Int. Cl.
*H04W 4/024* (2018.01)
*G06Q 10/02* (2012.01)

(52) U.S. Cl.
CPC ............ *H04W 4/024* (2018.02); *G06Q 10/02* (2013.01)

(58) Field of Classification Search
CPC ...... H04W 4/024; H04W 4/021; G06Q 10/02; G06Q 50/10
(Continued)

(56) References Cited

U.S. PATENT DOCUMENTS

| 10,521,673 B2 * | 12/2019 | Takeda .................. G06V 40/10 |
| 2014/0229480 A1 * | 8/2014 | Buxbaum ............. G06F 16/254 |
| | | 707/736 |

(Continued)

FOREIGN PATENT DOCUMENTS

| JP | 2013109395 A | 6/2013 |
| JP | 2015059032 A | 3/2015 |
| JP | 2016167208 A | 9/2016 |

OTHER PUBLICATIONS

International Search Report for Application No. PCT/JP2019/030642, dated Oct. 29, 2019.

*Primary Examiner* — Don N Vo
(74) *Attorney, Agent, or Firm* — Hoffmann & Baron, LLP

(57) ABSTRACT

A queue management device includes: a queue detection unit that, on the basis of a detection result of forming elements at a site subject to queue management, detects the state of the queue; a guidance position determination unit that, on the basis of the state of the queue detected by the queue detection unit, determines a guidance position where a guidance should be displayed; and a guidance display control unit that controls a display device such that the guidance is displayed at the guidance position determined by the guidance position determination unit.

10 Claims, 5 Drawing Sheets

(58) Field of Classification Search
USPC .................................................. 455/456.3
See application file for complete search history.

(56)  References Cited

U.S. PATENT DOCUMENTS

2018/0352378 A1\* 12/2018 Sahadi ................. G06Q 10/047
2022/0351522 A1\* 11/2022 Oami .................... G06M 11/00

\* cited by examiner

QUEUE MANAGEMENT DEVICE, QUEUE MANAGEMENT SYSTEM, QUEUE MANAGEMENT METHOD, AND COMPUTER-READABLE STORAGE MEDIUM

CROSS-REFERENCE TO RELATED APPLICATIONS

This application is the U.S. National Phase Application of International Application No. PCT/JP2019/030642, filed on Aug. 5, 2019, and asserts priority to Japanese Patent Application No. 2018-214620 filed on Nov. 15, 2018, all of which are hereby incorporated by reference herein in their entirety.

TECHNICAL FIELD

The present invention relates to a queue management device, a queue management system, a queue management method, and a computer-readable storage medium.

BACKGROUND ART

A user waiting to use a certain service or the like may form a waiting queue. In such a case, for example, unless personnel adjust the formation of the queue, the queue is simply formed so as to continue to the rear and, for example, may cause problems such as interfering with the surroundings.

Therefore, a technique is known for detecting the state of a queue and transmitting guidance information to a terminal device of a user forming the queue (see, for example, Patent Document 1).

PRIOR ART DOCUMENT

Patent Document

[Patent Document 1]
Japanese Unexamined Patent Application, First Publication No. 2013-109395

SUMMARY OF INVENTION

Problems to be Solved by the Invention

However, in the technique described in Patent Document 1, it is necessary for a user forming a queue to have a terminal device. In this case, it is not possible to provide guidance to a user who does not have a terminal device, and as a result, it is difficult to form an appropriate queue.

The present invention has been made in view of such circumstances, and aims to make it possible to guide a user who forms a queue so that the queue is formed appropriately even if the user forming the queue does not have a terminal device.

Means for Solving the Problems

One aspect of the present invention that solves the above-described problems is a queue management device, including: a queue detection unit configured to detect a state of a queue based on a detection result of a queue formation element at a site subject to queue management; a guidance position determination unit configured to determine a guidance position where a guidance is to be displayed, based on the state of the queue detected by the queue detection unit; and a guidance display control unit configured to control a display device such that the guidance is displayed at the guidance position determined by the guidance position determination unit.

Further, one aspect of the present invention is a queue management system, including a queue formation element detection device, a display device, and a queue management device, wherein the queue formation element detection device is configured to detect a queue formation element at a site subject to queue management, and detect the queue formation element, and the queue management device includes: a queue detection unit configured to detect a state of a queue based on a detection result of the queue formation element detection device; a guidance position determination unit configured to determine a guidance position where a guidance is to be displayed, based on the state of the queue detected by the queue detection unit; and a guidance display control unit configured to control a display device such that the guidance is displayed at the guidance position determined by the guidance position determination unit.

Further, one aspect of the present invention is a queue management method in a queue management device, the method including: a queue detection step of detecting a state of a queue based on a detection result of a queue formation element at a site subject to queue management; a guidance position determination step of determining a guidance position where a guidance is to be displayed, based on the state of the queue detected by the queue detection step; and a guidance display control step of controlling a display device such that the guidance is displayed at the guidance position determined by the guidance position determination step.

Further, one aspect of the present invention is a computer-readable storage medium storing a program for causing a computer to function as: a queue detection unit that detects a state of a queue based on a detection result of a queue formation element at a site subject to queue management; a guidance position determination unit that determines a guidance position where a guidance is to be displayed, based on the state of the queue detected by the queue detection unit; and a guidance display control unit that controls a display device such that the guidance is displayed at the guidance position determined by the guidance position determination unit.

Advantageous Effects of the Invention

As described above, according to the present invention, even if a user forming a queue does not have a terminal device, the user can be guided so that the queue is formed appropriately.

EMBODIMENTS FOR CARRYING OUT THE INVENTION

Figure 1:
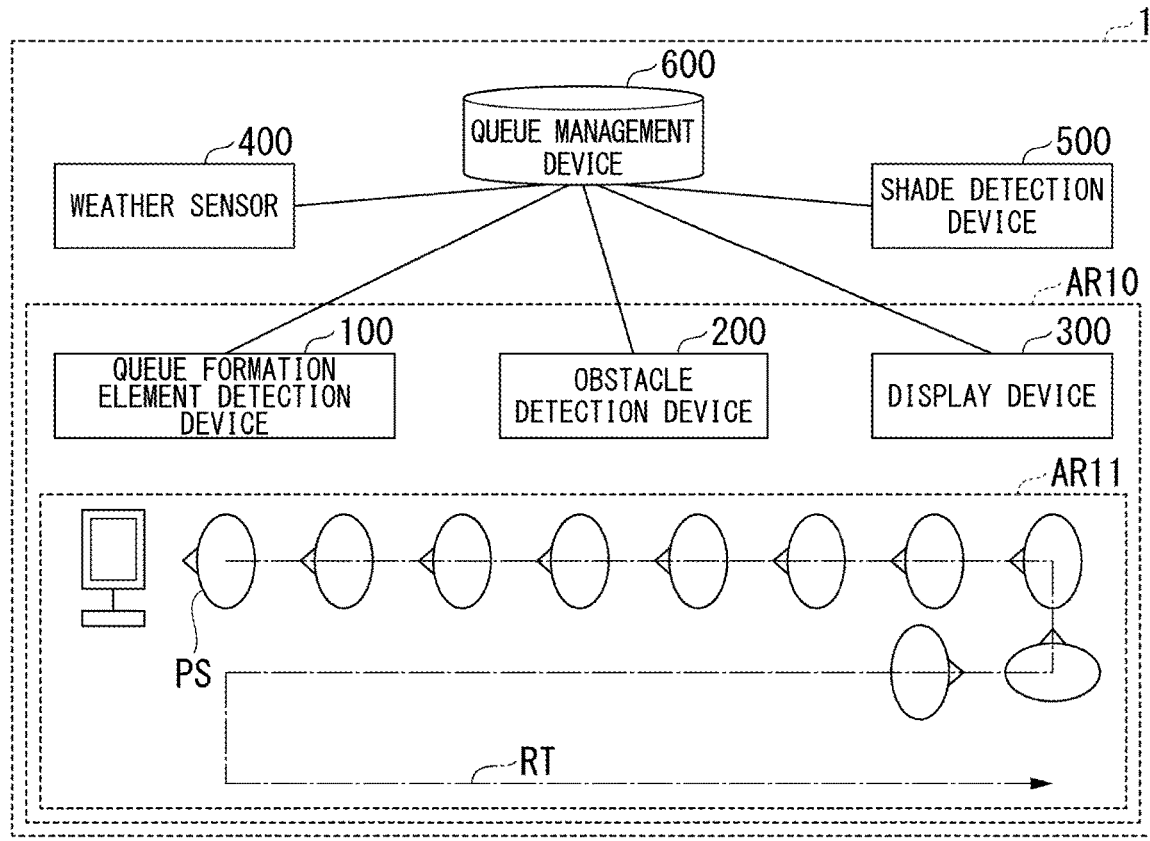
FIG. 1 is a diagram showing a configuration example of a queue management system according to the present embodiment.

FIG. 1 shows a configuration example of a queue management system 1 of the present embodiment. The queue management system 1 in the figure includes a queue formation element detection device 100, an obstacle detection device 200, a display device 300, a weather sensor 400, a shade detection device 500, and a queue management device 600.

The queue formation element detection device 100, the obstacle detection device 200, and the display device 300 are provided corresponding to one queue management target area AR10. The queue management target area AR10 is a range of sites where one specific queue can be generated. That is, the queue management target area AR10 corresponds to one specific queue. When there is an overlapping portion between a plurality of queue management target areas AR10 corresponding to different queues, as for the queue formation element detection device 100 and the obstacle detection device 200, the same one may be shared among a plurality of queue management target areas AR10.

The queue formation element detection device 100 is a device that detects a queue formation element existing in the queue management target area AR10. A queue formation element is an element that forms a queue. The case where the queue formation element of the present embodiment is a person is taken as an example. The queue formation element detection device 100 may be, for example, an imaging device that captures an image.

The obstacle detection device 200 detects obstacles existing in the queue management target area AR10. The obstacle here is one that exists at a fixed position in the queue management target area AR10, for example, having a certain height from the ground. At the position where such an obstacle exists, there cannot be a person forming a queue (standing and positioning). The obstacle detection device 200 may be, for example, an imaging device that captures an image. The queue formation element detection device 100 and the obstacle detection device 200 corresponding to the same queue management target area AR10 may be shared by the same imaging device.

The display device 300 is a device for guiding the position (guidance position) a user should line up in following the end of the queue in the queue management target area AR10. The display device 300 of the present embodiment is, for example, a projector, and projects and displays a guidance image that guides the ground corresponding to the guidance position to be lined up at the guidance position in the queue management target area AR10. Further, since the guidance position of the display device 300 changes according to the formation of the queue, the display device 300 may be configured so that the projection direction can be changed according to the control of the queue management device 600, for example.

A plurality of such display devices 300 may be provided for each predetermined position in the queue management target area AR10. As a result, the guidance display can always be appropriately displayed by appropriately switching the display device 300 for displaying the guidance display in response to the change in the guidance position according to the extension of the queue.

The weather sensor 400 collectively indicates apparatuses and devices for detecting a predetermined event related to the weather in the queue management target area AR10. The weather sensor 400 includes a rainfall sensor that detects whether or not it is raining, a wind speed wind direction sensor that detects wind speed and direction, a temperature sensor that detects air temperature, and the like.

The shade detection device 500 is a device provided to detect shade in the queue management target area AR10. The shade detection device 500 may be, for example, an imaging device provided so as to image a site where shade occurs in the queue management target area AR10.

The queue management device 600 manages the queue generated in the queue management target area AR10. The queue management device 600 guides the user so that the queue generated in the queue management target area AR10 is appropriately formed as the queue management. In the following description, a case where the queue management target area AR10 of the present embodiment is a site corresponding to a bus stop will be given as an example.

When the queue management device 600 detects that a queue has been generated by a user PS in the queue management target area AR10, the queue management device 600 sets the queue formation area AR11 corresponding to the generated queue in the queue management target area AR10. The queue formation area AR11 is a range of sites where the extending queue is to be formed when the generated queue extends thereafter. The queue management device 600 sets the queue route RT in the set queue management target area AR10.

The queue route RT is the route on which the queue is to be formed. The queue management device 600 performs control for guiding a user who is going to line up following the end of the queue to the position where the user who is going to line up following the end of the queue should stand, so that the subsequent queue is formed along the set queue route RT. Guidance regarding the position where the user should stand is performed by the guidance display by the display device 300.

The queue management device 600 may be installed at a predetermined site in the queue management target area AR10 or in the vicinity of the queue management target area AR10. Further, the queue management device 600 may be configured to centrally manage the queues in each of the plurality of queue management target areas AR10.

Figure 2:
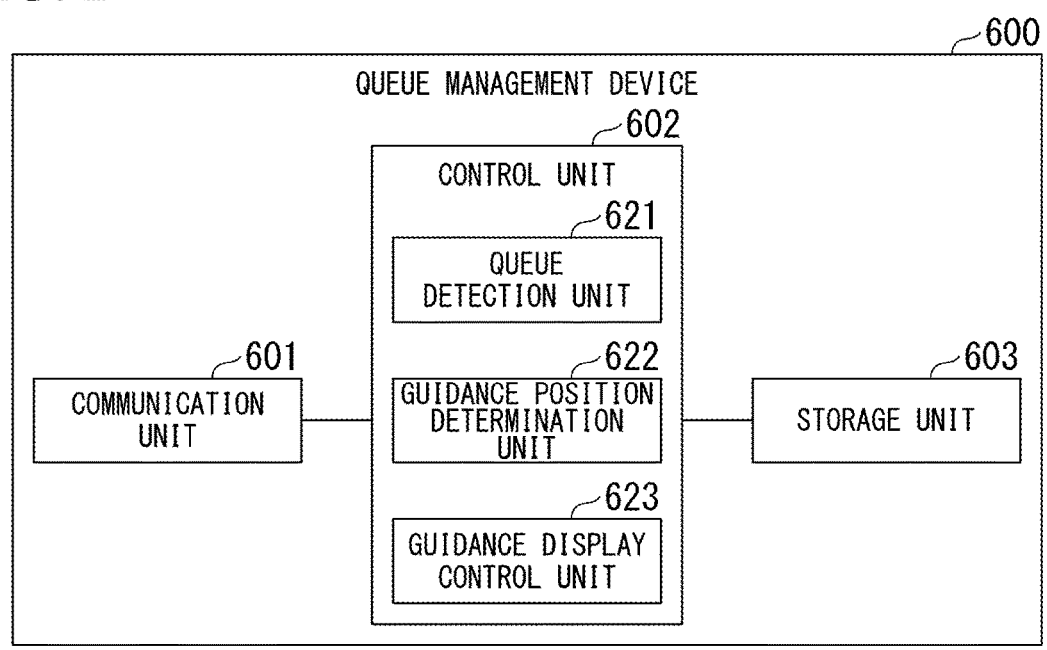
FIG. 2 is a diagram showing a configuration example of a queue management device according to the present embodiment.

FIG. 2 shows a configuration example of the queue management device 600. The queue management device 600 in the figure includes a communication unit 601, a control unit 602, and a storage unit 603.

The communication unit 601 communicates with other devices in the queue management system 1 such as the queue formation element detection device 100, the obstacle detection device 200, the display device 300, the weather sensor 400, and the shade detection device 500. Communication between the communication unit 601 and each device other than the queue management device 600 in the queue management system 1 may be wired or wireless.

The control unit 602 performs various controls in the queue management device 600. The function of the control unit 602 is realized by executing a program by a CPU (Central Processing Unit) included in the queue management device 600. The control unit 602 includes a queue detection unit 621, a guidance position determination unit 622, and a guidance display control unit 623.

The queue detection unit 621 detects the state of the queue based on the detection result of a person (queue formation element) in the queue management target area AR10 (an example of the site subject to queue management).

The guidance position determination unit 622 determines the guidance position to be displayed based on the state of the queue detected by the queue detection unit 621.

The guidance display control unit 623 controls the display device 300 so that the guidance display is performed at the guidance position determined by the guidance position determination unit 622.

The storage unit 603 stores various types of information corresponding to the queue management device 600.

The process performed by the queue management device 600 of the present embodiment in connection with the guidance display will be described.

First, the queue detection unit 621 of the queue management device 600 detects the queue generated in the queue management target area AR10. In detecting the queue, the queue detection unit 621 acquires the detection information output by the queue formation element detection device 100. Here, a case where the queue formation element detection device 100 is an imaging device and the detection information is a captured image will be taken as an example. The captured image may be a moving image or a still image captured at predetermined time intervals.

The queue detection unit 621 performs image analysis on the captured image acquired from the queue formation element detection device 100 to detect a person. Next, among the detected people, those who are in a state of staying without moving for a certain period of time (stayers) are identified.

Next, the queue detection unit 621 determines whether or not there is a stayer in a certain range predetermined as the head determination area in the queue management target area AR10 from among the identified stayer. When there is a stayer in the head determination area, the stayer is detected as a first user PS-ST in the queue. When the first user PS-ST is detected, the queue detection unit 621 defines the first user PS-ST as the base point stayer, and determines whether or not another stayer exists within a certain distance around the base point stayer. When there is another stayer, the queue detection unit 621 determines that a queue is formed by the target stayer and the other stayer. Here, in determining the existence of another stayer with the base point stayer as the base point, an angle range other than the position where the previous base point stayer may exist may be targeted with the base point stayer as the base point. As a result, even when the queue is bent in the middle, the existence of other stayers can be determined in response to the change in the arrangement position of the stayers at the bent part.

Next, the queue detection unit 621 defines another stayer who is determined to form a queue as the target stayer, and determines whether or not there is another stayer within a certain distance around the target stayer among the stayers who are not yet included in the queue. When there is another stayer, the queue detection unit 621 determines the existence of the other stayer with the other stayer as the next target stayer. The queue detection unit 621 detects that it has reached the end of the queue at the stage when it is determined that there are no other stayers.

When the queue is detected as described above, the guidance position determination unit 622 sets the queue formation area AR11 including the detected queue. The queue formation area AR11 is an area in a certain range in which the queue should be formed when the queue currently detected is extended thereafter. Further, the guidance position determination unit 622 sets the queue route RT in the queue formation area AR11 according to the size and shape of the set queue formation area AR11.

Figure 3A:
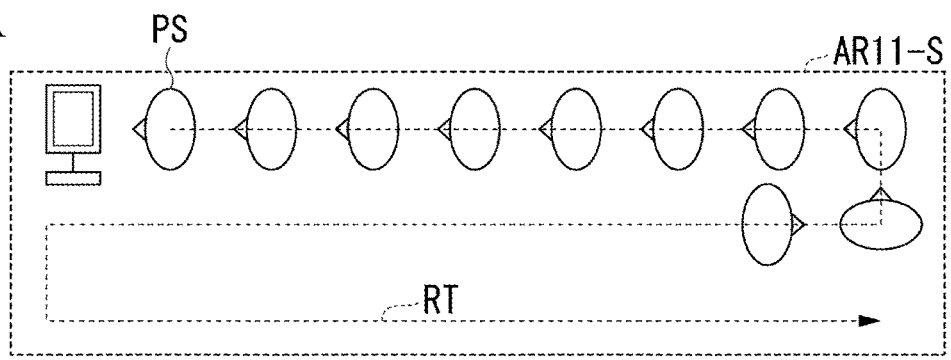
FIG. 3A is a diagram explaining a setting of a queue formation area in the present embodiment.

The setting of the queue formation area AR11 will be described with reference to FIGS. 3A to 3D. As the queue formation area AR11, first, as shown in FIG. 3A, a standard queue formation area AR11-S is defined. The standard queue formation area AR11-S may be predetermined, or may be determined by the guidance position determination unit 622 based on the surrounding environment according to a predetermined algorithm.

In the standard queue formation area AR11-S, the queue route RT of the standard pattern is also predetermined corresponding to the standard queue formation area AR11-S. The queue route RT can be formed according to a rule that, for example, a straight line is extended by arranging virtual users from the beginning along the direction in which the queue is formed, and when the virtual users reach the end of the queue formation area AR11, the straight line is folded back and extended in the direction opposite the previous extending direction.

The standard queue formation area AR11-S and the queue route RT in the standard queue formation area AR11-S may be determined according to the queue formation pattern that is assumed to be the most appropriate when the queue to be managed is formed.

Then, the guidance position determination unit 622 can change the queue formation area AR11 to a size and shape other than the standard queue formation area AR11-S in accordance with the environmental state of the queue management target area AR10.

For example, as the environmental condition of the queue management target area AR10, an obstacle may exist due to a large temporary item of baggage or the like being placed within the range of the standard queue formation area AR11-S. When an obstacle is present in this way, users PS cannot stand side by side at the site where the obstacle exists.

Therefore, the guidance position determination unit 622 may change the queue formation area AR11 and the queue route RT in the queue formation area AR11 according to the presence of an obstacle.

Figure 3B:
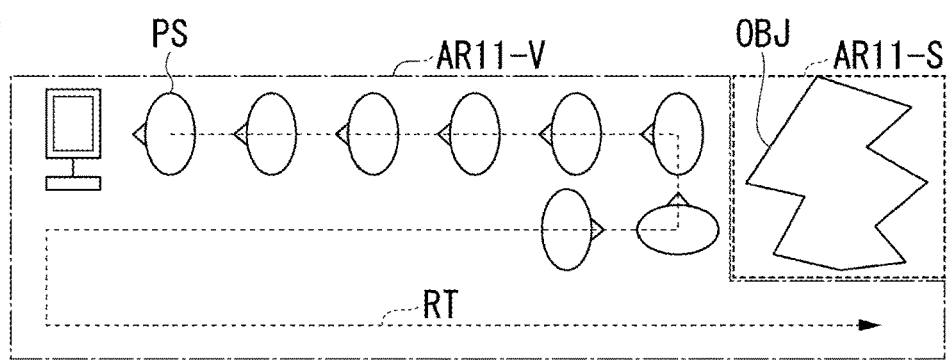
FIG. 3B is a diagram explaining the setting of the queue formation area in the present embodiment.

FIG. 3B shows an example of a modified queue formation area AR11-V whose dimensions and shape are changed from the standard queue formation area AR11-S according to the presence of an obstacle OBJ. The dimensions and shape of the modified queue formation area AR11-V in the figure are changed so as to remove the range in which the obstacle OBJ exists from the standard queue formation area AR11-S. Further, the queue route RT is also changed from the standard pattern according to the size and shape of the modified queue formation area AR11-V.

Further, as an environmental condition of the queue management target area AR10, when it rains (or snows or the like), for example, in the queue management target area AR10, it is preferable to prevent the user PS lined up in the queue from being exposed to rain by using equipment such as a roof.

Therefore, the guidance position determination unit 622 may set the modified queue formation area AR11-V so that the queue is not rained on when it becomes rainy.

Figure 3C:
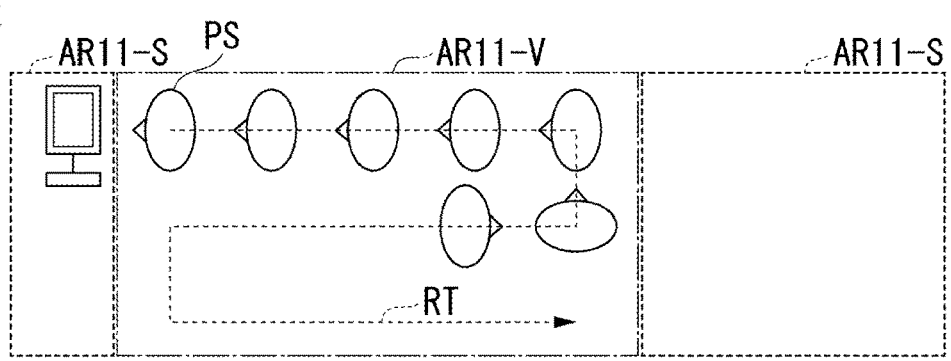
FIG. 3C is a diagram explaining the setting of the queue formation area in the present embodiment.

FIG. 3C shows an example of the modified queue formation area AR11-V whose dimensions and shape have been changed from the standard queue formation area AR11-S according to the rainfall state. The range of the modified queue formation area AR11-V shown in the figure is a range in which the users PS lined up in the queue are not exposed to rain.

In order to enable the change to the modified queue formation area AR11-V corresponding to such a rainfall state, for example, the storage unit 603 stores equipment information indicating the arrangement of equipment such as a roof in the queue management target area AR10. When the guidance position determination unit 622 determines that a rainfall state has occurred based on the detection information output from the weather sensor 400, it specifies a range not exposed to rain based on the arrangement of equipment such as a roof in the queue management target area AR10 indicated by the equipment information. As the simplest example, the guidance position determination unit 622 may set a range overlapping with the roof arrangement as the modified queue formation area AR11-V corresponding to the rainfall state in the standard queue formation area AR11-S.

Further, when changing to the modified queue formation area AR11-V corresponding to the above-described rainfall state, the guidance position determination unit 622 may determine the range of the modified queue formation area AR11-V by further utilizing the wind direction and wind speed indicated by the detection information output from the weather sensor 400. That is, the guidance position determination unit 622 obtains the movement direction and the movement amount in the range specified as overlapping with the roof arrangement in the queue management target area AR10 according to the wind direction and the wind speed indicated by the detection information of the weather sensor 400. The guidance position determination unit 622 moves the range specified by the obtained movement direction and the movement amount. The range thus moved is set as the modified queue formation area AR11-V corresponding to the rainfall state. Further, the guidance position determination unit 622 sets the queue route RT according to the size and shape of the modified queue formation area AR11-V set in this way.

The guidance position determination unit 622 may set the modified queue formation area AR11-V corresponding to the rainfall state based on the information of the weather (rainfall, rain clouds, wind speed, wind direction, etc.) acquired via the network, for example.

Further, as an environmental condition of the queue management target area AR10, for example, in a climate where it becomes sunny in summer, the sun becomes extremely hot. In such a severe heat state, it is preferable that the queue be formed in a shaded area in the queue management target area AR10.

Therefore, in a severe heat state, the guidance position determination unit 622 may set the modified queue formation area AR11-V so that the queue is shaded.

Figure 3D:
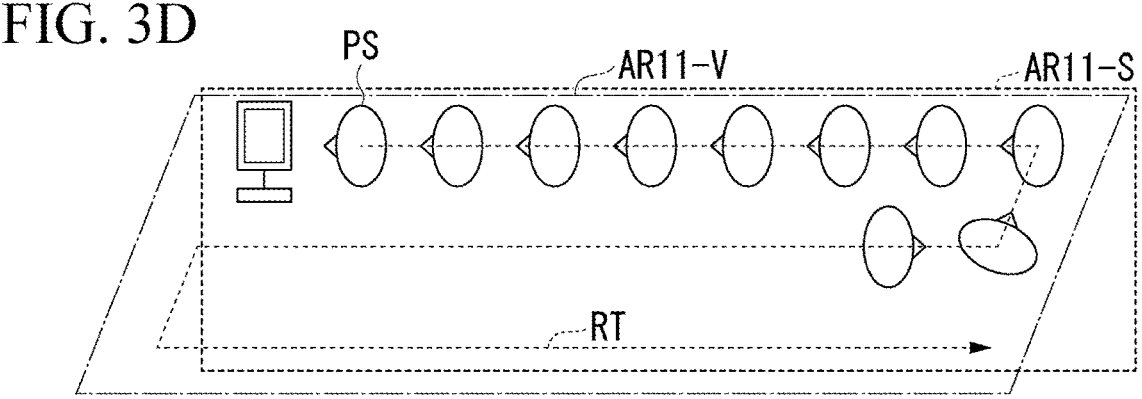
FIG. 3D is a diagram explaining the setting of the queue formation area in the present embodiment.

FIG. 3D shows an example of the modified queue formation area AR11-V whose dimensions and shape have been changed from the standard queue formation area AR11-S in response to the severe heat state. The range of the modified queue formation area AR11-V shown in the figure is a shaded area.

As a process corresponding to the change to the modified queue formation area AR11-V corresponding to such a severe heat state, when determining that it is extremely hot based on the detection information output from the weather sensor 400, the guidance position determination unit 622 specifies a currently shaded area (shaded area) in the queue management target area AR10 at present, based on the captured image as the detection information of the shade detection device 500.

Alternatively, the shaded area may be specified as follows. For example, the storage unit 603 stores equipment information indicating the arrangement of equipment such as a roof in the queue management target area AR10. When it is determined that the weather has become hot based on the detection information output from the weather sensor 400, the guidance position determination unit 622 specifies a shaded area based on the arrangement of equipment such as a roof in the queue management target area AR10 indicated by the equipment information and the direction of the sun according to the current date and time.

For example, the shaded area specified as described above may be the modified queue formation area AR11-V corresponding to the severe heat state. Further, the guidance position determination unit 622 sets the queue route RT according to the size and shape of the modified queue formation area AR11-V set in this way.

In addition, the guidance position determination unit 622 may set the modified queue formation area AR11-V corresponding to the severe heat state based on the weather information acquired from a service such as a weather forecast provided on the network, for example.

When the queue formation area AR11 and the queue route RT are set as described above, the guidance position determination unit 622 sets the guidance position corresponding to the currently formed queue. The guidance position is a position where the next user should line up following the end of the currently formed queue.

Figure 4A:
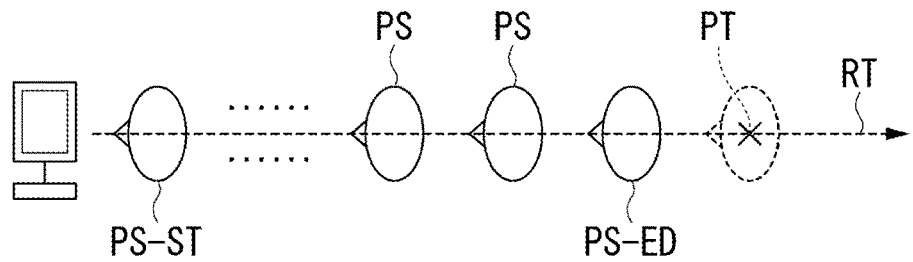
FIG. 4A is a diagram showing an example of setting a guidance position in the present embodiment.

FIG. 4A schematically shows the queue detected by the queue detection unit 621. In the figure, among the users PS forming a queue, the first person is shown as the user PS-ST, and the last person is shown as the user PS-ED. In the figure, the queue route RT set by the guidance position determination unit 622 together with the queue formation area AR11 is shown corresponding to the queue.

The guidance position determination unit 622 sets a position separated by a predetermined distance from the user PS-ED lined up at the end on the set queue route RT as the guidance position PT.

Figure 4B:
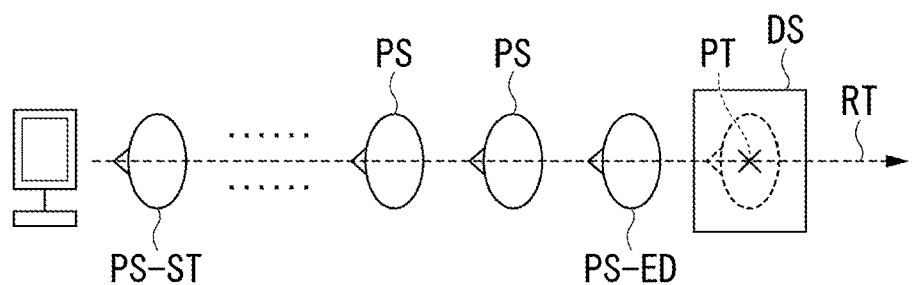
FIG. 4B is a diagram showing an example of setting a guidance position in the present embodiment.

As shown in FIG. 4B, the guidance display control unit 623 controls the display device 300 so that the guidance image DS is displayed on the ground corresponding to the set guidance position PT. At this time, when a plurality of display devices 300 are provided, the guidance display control unit 623 selects the display device 300 closest to the guidance position PT as the display control target from the plurality of display devices 300. The guidance display control unit 623 sets the projection direction of the display device 300 to be displayed and controlled so that the optical axis of the projected image corresponds to the guidance position PT, and projects the guidance image DS.

Figure 5:
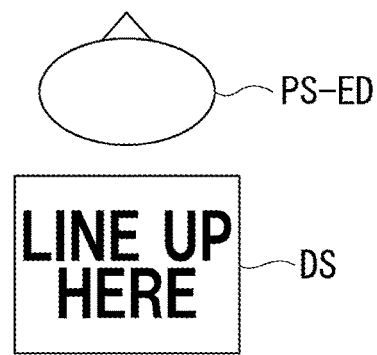
FIG. 5 is a diagram showing an example of a guidance image in the present embodiment.

FIG. 5 shows an example of the guidance image DS. As shown in the figure, behind the last user PS-ED, the guidance image DS is displayed including a message instructing the user PS who is going to line up next in the queue to line up at the position where the guidance image DS is displayed.

Figure 6:
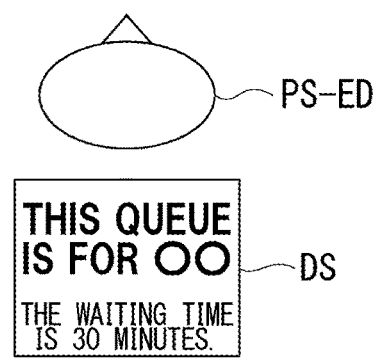
FIG. 6 is a diagram showing an example of a guidance image in the present embodiment.

FIG. 6 shows another embodiment of the message shown in the guidance image DS. In the guidance image DS of the figure, the purpose of the corresponding queue is shown and the waiting time is shown. The waiting time may be calculated by the guidance display control unit 623 based on the number of users PS forming the queue detected by the queue detection unit 621 and the waiting time per person in the queue.

For example, a signboard at the same bus stop may be assigned multiple different destinations. In such a case, at one bus stop, a plurality of queues may be formed according to each destination. In such a case, it is indicated which destination the queue corresponds to for the guidance image DS to be displayed corresponding to each formed queue, and therefore the user PS lining up in the queue no longer needs to wonder which line corresponds to his/her destination. Further, in such a case, the display position (initial display position) of the guidance image DS in the initial state when the queue is not formed is determined in advance corresponding to each destination. Then, when the queue is not formed, the guidance image DS indicating each destination may be displayed at the initial display position.

By displaying the guidance in this way, a user who wants to line up in the queue can easily perceive the site where he/she should stand without receiving guidance from a staff member or the like or checking with his/her own terminal device. Further, the guidance display is performed along the queue route RT set within the range of the site as the queue formation area AR11. Therefore, in the present embodiment, it is possible to appropriately form a queue without the guidance of a staff member or confirmation by a terminal device.

Further, in the present embodiment, the queue formation area AR11 and the queue route RT are set according to the environmental conditions of the queue management target area AR10 such as obstacles, wind and rain, and sunshine. That is, in the present embodiment, a queue is appropriately formed so that a problem does not occur for the user PS and the queue can be arranged as comfortably as possible according to the environmental conditions.

Figure 7:
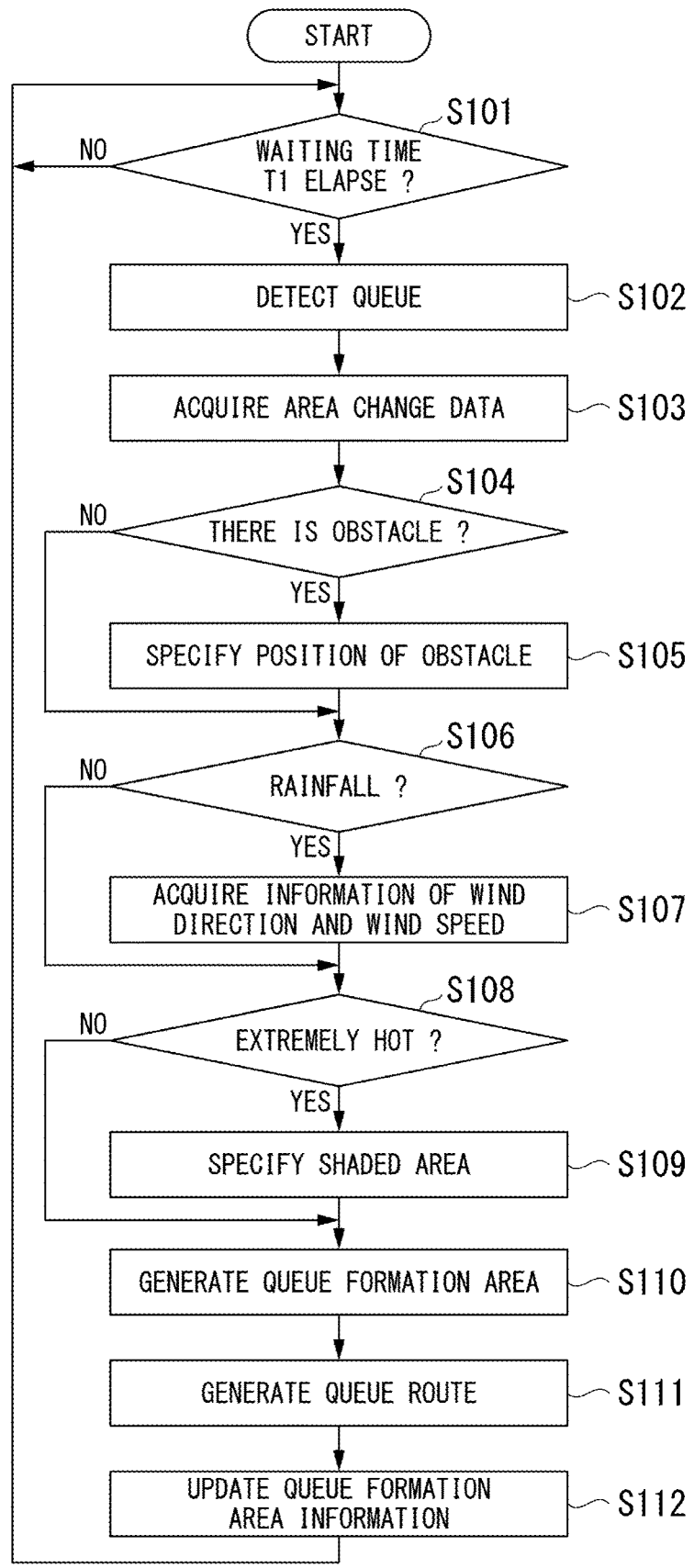
FIG. 7 is a flowchart showing an example of a processing procedure performed by the queue management device in the present embodiment in connection with the setting of the queue formation area.

An example of a processing procedure performed by the queue management device 600 in connection with the setting of the queue formation area AR11 will be described with reference to the flowchart of FIG. 7.

Step S101: In the queue management device 600, the queue detection unit 621 first waits for the waiting time T1 to elapse from the elapsed timing of the last waiting time T1. That is, the process related to the setting of the queue formation area AR11 in the figure is performed every time the waiting time T1 elapses. As an example, the standby time T1 is about 10 minutes.

Step S102: In response to the elapse of the waiting time T1, the queue detection unit 621 detects the queue currently generated in the queue management target area AR10 based on the detection information of the queue formation element detection device 100. In the queue detection here, first, the presence or absence of the occurrence of the queue is detected, and if the queue is generated, the state of the queue is detected. As the state of the queue, for example, the position where the queue is formed, the number of users PS forming the queue, and the like are detected.

Step S103: Next, the guidance position determination unit 622 acquires the area change data. The area change data is information used for changing the queue formation area AR11 from the standard queue formation area AR11-S to the modified queue formation area AR11-V. Specifically, the area change data includes the detection information of the obstacle detection device 200, the detection information of the weather sensor 400, the detection information of the shade detection device 500, and the like.

Step S104: The guidance position determination unit 622 determines whether or not there is an obstacle in the queue management target area AR10 based on the detection information of the obstacle detection device 200 included in the area change data acquired in step S103. For determination of whether or not there is an obstacle, for example, when the detection information of the obstacle detection device 200 is a captured image, image analysis may be used to determine whether or not there is an object other than a person constantly existing at a fixed position.

Step S105: When it is determined in step S104 that there is an obstacle, the guidance position determination unit 622 specifies the position in the queue management target area AR10 where the obstacle is placed.

Step S106: After the processing of step S105, or when it is determined in step S104 that there is no obstacle, the guidance position determination unit 622 determines whether or not it is currently in a rainfall state based on the detection information of the weather sensor 400.

Step S107: When it is determined that it is currently in a rainfall state, the guidance position determination unit 622 acquires information of wind direction and wind speed included in the detection information of the weather sensor 400 as information used for setting the position of the queue formation area AR11.

Step S108: After the processing of step S107, or when it is determined in step S106 that there is no rainfall, it is determined whether or not the current climate is extremely hot.

Step S109: When it is determined that it is extremely hot, the guidance position determination unit 622 specifies an area (shaded area) that is shaded in the queue management target area AR10.

Step S110: The guidance position determination unit 622 generates a queue formation area AR11 that reflects the results of the processes of steps S102 to S109 of this time. For example, when the position of the obstacle is specified in step S105, the guidance position determination unit 622 generates the queue formation area AR11 so that the site of the obstacle OBJ is excluded as shown in FIG. 3B. Further, when it is determined in step S106 that there is rainfall and information of the wind direction and wind speed is acquired in step S107, the guidance position determination unit 622 generates a queue formation area AR11 in a range in which the user PS in the queue is not exposed to rain as shown in FIG. 3C. Further, when it is determined in step S108 that it is extremely hot and the shaded area is specified in step S109, the guidance position determination unit 622 generates the queue formation area AR11 so that the queue is within the shaded area. Further, when the guidance position determination unit 622 determines that there is no obstacle and it is neither a rainfall state nor an extremely hot state, the guidance position determination unit 622 generates the standard queue formation area AR11-S.

Although it was raining when the processing in the figure was started, there are cases where at least a part of the queue has already been formed at a site where it will rain. Similarly, it was extremely hot when the processing of the figure was started, but at least a part of the queue may have already been formed in the sun. In such a case, the guidance position determination unit 622 may maintain the current state of the already formed queue, and may generate the queue formation area AR11 so that the queue to be extended thereafter is at a site where it will not be exposed to rain or in the shade.

Step S111: The guidance position determination unit 622 generates the queue route RT in the queue formation area AR11 generated in step S110.

Step S112: The guidance position determination unit 622 updates the queue guidance information that has been stored in the storage unit 603 so far by the queue formation area information including the queue formation area AR11 generated in step S110 and the queue route RT generated in step S111.

Figure 8:
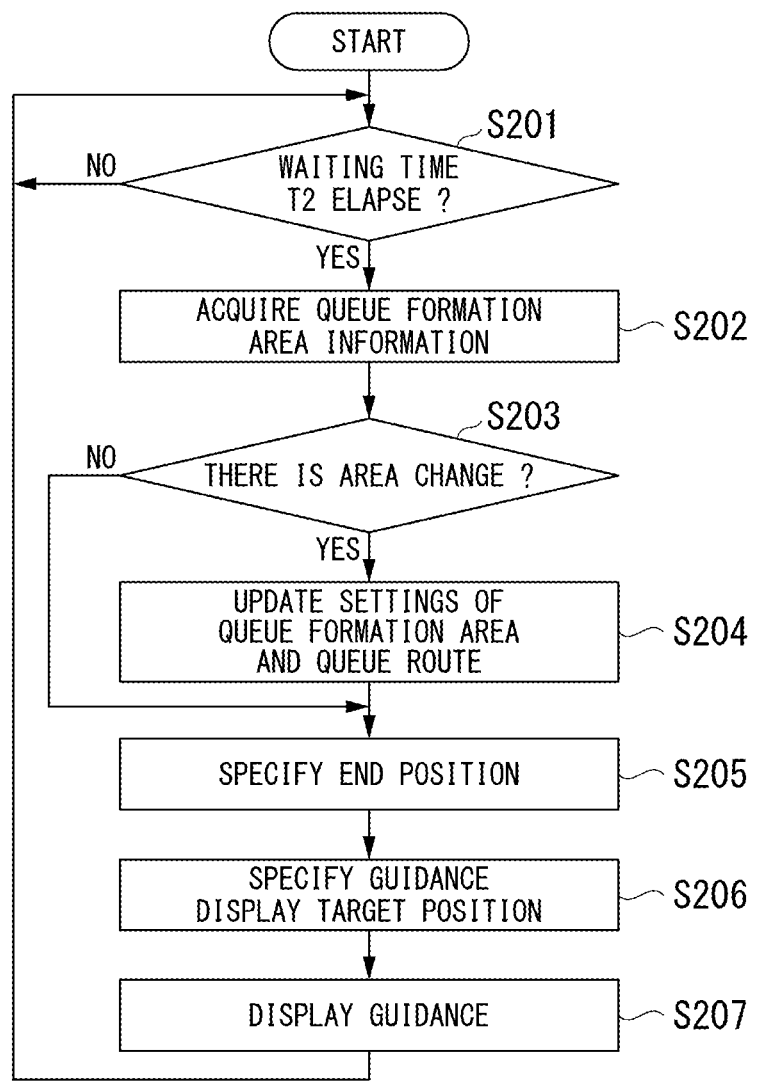
FIG. 8 is a flowchart showing an example of a processing procedure performed by the queue management device in the present embodiment in response to the guidance display.

Next, with reference to the flowchart of FIG. 8, an example of a processing procedure performed by the queue management device 600 corresponding to the guidance display will be described.

Step S201: In the queue management device 600, the guidance display control unit 623 waits for the waiting time T2 to elapse from the elapsed timing of the last waiting time T2. That is, the guidance display is updated every waiting time T2. The waiting time T2 is shorter than the waiting time T1 corresponding to the setting of the queue formation area AR11, and is about 5 seconds as an example.

Step S202: When the waiting time T2 elapses, the guidance position determination unit 622 acquires the queue formation area information currently stored in the storage unit 603.

Step S203: As for the queue formation area AR11 indicated by the queue formation area information acquired in step S202 of this time, the guidance position determination unit 622 determines whether or not the queue formation area information acquired in the previous step S202 has a change from the queue formation area AR11. The guidance position determination unit 622 may determine that the queue formation area AR11 has been changed if, for example, at least one of the arrangement positions, dimensions, shapes, etc. of the queue formation area AR11 is changed.

Step S204: When it is determined that there is a change in the queue formation area AR11, the guidance position determination unit 622 updates the settings of the queue formation area AR11 and the queue route RT for the guidance display control, by the queue formation area AR11 and the queue route RT indicated by the queue formation area information acquired in step S202 of this time.

Step S205: After the processing of step S204, or when it is determined in step S203 that the queue formation area AR11 has not changed, the queue detection unit 621 specifies the position (end position) of the user PS at the end of the current queue.

For this purpose, the queue detection unit 621 specifies the last user PS among the users PS forming the queue by detecting the queue at the present time. Next, the queue detection unit 621 specifies the position of the specified last user PS. The position of the last user PS can be specified, for example, as follows when the detection information of the queue formation element detection device 100 is a captured image. The queue detection unit 621 acquires imaging condition information such as the installation position of the queue formation element detection device 100 as an imaging device, the imaging direction, and the viewing angle of imaging. The queue detection unit 621 specifies at which position in the plan view of the queue management target area AR10 the last user PS existing in the captured image exists based on the acquired imaging condition information, to specify the end position.

The process shown in the figure is performed a predetermined number of times in, for example, the standby time T1. In addition, there is a possibility that many users PS will be newly lined up in the queue in a certain short time. Therefore, for example, the result of the queue detection in step S205 of this time may be significantly different from the result of the queue detection in step S102 in FIG. 7.

Therefore, the guidance position determination unit 622 may determine whether or not the result of the queue detection in step S205 has a certain degree of deviation from the result of the queue detection in the last step S102. As a determination of whether or not the degree of deviation is above a certain level, for example, it may be determined whether or not the increase in the number (or rate of increase) of users PS forming the queue is above a certain level.

When it is determined that the degree of deviation is equal to or higher than a certain level, the guidance position determination unit 622 regenerates the queue formation area AR11 and the queue route RT at this stage, and the queue for display control is based on the regenerated result. The formation area AR11 and the queue route RT may be updated. The guidance position determination unit 622 identifies the end position in step S205 based on the updated queue formation area AR11 and the queue route RT.

Step S206: The guidance position determination unit 622 specifies a position (guidance position) at which the guidance display should be performed. The guidance position determination unit 622 specifies a position where the user PS is lined up following the end position specified in step S205 on the queue route RT currently set for guidance display control as a guidance position.

Step S207: The guidance display control unit 623 controls the display device 300 so that the guidance image DS shown in FIGS. 5, 6 and the like is displayed on the ground at the guidance position specified in step S206.

As the display device 300, a lighting device may be used in addition to the projector. Further, the display device 300 may be composed of, for example, a display device provided on the floor surface.

Further, the queue management system of the present embodiment may be applied to the management of various queues formed at sites other than a bus stop, such as train platforms, stores, and event openings. In addition, the queue formation elements may be appropriately changed according to the environment to which the queue management system of the present embodiment is applied. For example, in a work environment in which objects are arranged side by side so as to form a queue, the queue management system may manage the queue using an object as a queue formation element.

The program for realizing the function as the above-described queue management device 600 may be recorded on a computer-readable recording medium, and the program recorded on the recording medium may be read by the computer system and executed, so that the process as the queue management device 600 may be performed. Here, "loading and executing a program recorded on a recording medium into a computer system" includes installing the program in the computer system. The term "computer system" as used herein includes hardware such as an OS and peripheral devices. Further, the "computer system" may include a plurality of computer devices connected via a network including a communication line such as the Internet, WAN, LAN, and a dedicated line. Further, the "computer-readable recording medium" refers to a portable medium such as a flexible disk, a magneto-optical disk, a ROM, or a CD-ROM, or a storage device such as a hard disk built in a computer system. As described above, the recording medium in which the program is stored may be a non-transient recording medium such as a CD-ROM. The recording medium also includes an internal or external recording medium that can be accessed from the distribution server to distribute the program. The code of the program stored in the recording medium of the distribution server may be different from the code of the program in a format that can be executed by the terminal device. That is, the format stored in the distribution server does not matter as long as it can be downloaded from the distribution server and installed in a form that can be executed by the terminal device. The program may be divided into a plurality of parts, downloaded at different timings, and then combined by the terminal device, or the distribution server that distributes each of the divided programs may be different. Furthermore, a "computer-readable recording medium" includes a medium that holds a program for a certain period of time, such as a volatile memory (RAM) inside a computer system that serves as a server or client when the program is transmitted via a network. Further, the above program may be for realizing some of the above-described functions. Further, a so-called difference file (difference program) may be used, which can realize the above-described functions in combination with a program already recorded in the computer system.

INDUSTRIAL APPLICABILITY

The present invention is widely applicable to queue management devices, queue management systems, queue management methods and computer-readable storage mediums storing programs, and even if a user forming a queue does not have a terminal device, the user can be guided to form a queue appropriately.

DESCRIPTION OF THE REFERENCE SYMBOLS

1 Queue management system
100 Queue formation element detection device
200 Obstacle detection device
300 Display device
400 Weather sensor
500 Shade detection device
600 Queue management device
601 Communication unit
602 Control unit
603 Storage unit
621 Queue detection unit
622 Guidance position determination unit
623 Guidance display control unit

The invention claimed is:

1. A queue management device, comprising:
a queue detection unit configured to detect a state of a queue based on a detection result of a queue formation element at a site subject to queue management;
a guidance position determination unit configured to determine a guidance position where a guidance is to be displayed, based on a position at an end of the queue that is specified based on the state of the queue detected by the queue detection unit, wherein the guidance position determination unit is configured to:
set a queue formation area, which is a range of sites where a queue should be formed when the queue detected by the queue detection unit is further extended;
determine a route of the queue to be formed when further extending the queue in the queue formation area which has been set; and
define a position to be lined up following the position at the end of the queue as the guidance position determined based on the route which has been determined; and
a guidance display control unit configured to control a display device such that the guidance is displayed at the guidance position determined by the guidance position determination unit.

2. The queue management device according to claim 1, wherein
the guidance position determination unit is configured to set the queue formation area based on an environmental condition corresponding to the site subject to queue management.

3. The queue management device according to claim 2, wherein
the guidance position determination unit is configured to set the queue formation area based on an obstacle detected at the site subject to queue management.

4. The queue management device according to claim 2, wherein
the guidance position determination unit is configured to set the queue formation area based on a weather corresponding to the site subject to queue management.

5. The queue management device according to claim 4, wherein
the guidance position determination unit is configured to set the queue formation area in a range of a site where the queue is not exposed to rain in a case of rain by equipment of the site subject to queue management.

6. The queue management device according to claim 5, wherein
the guidance position determination unit is configured to set the queue formation area in the range of the site where the queue is not exposed to rain by the equipment of the site subject to queue management, based on a wind condition at the site subject to queue management.

7. The queue management device according to claim 4, wherein
the guidance position determination unit is configured to set the queue formation area in a range of a site where the queue is shaded by the equipment of the site subject to queue management.

8. A queue management system, comprising:
a queue formation element detection device configured to detect a queue formation element at a site subject to queue management; and
a queue management device includes, comprising:
a queue detection unit configured to detect a state of a queue based on a detection result of the queue formation element detection device;
a guidance position determination unit configured to determine a guidance position where a guidance is to be displayed, based on a position at an end of the queue that is specified based on the state of the queue detected by the queue detection unit, wherein the guidance position determination unit is configured to:
set a queue formation area, which is a range of sites where a queue should be formed when the queue detected by the queue detection unit is further extended;
determine a route of the queue to be formed when further extending the queue in the queue formation area which has been set; and define a position to be lined up following the position at the end of the queue as the guidance position determined based on the route which has been determined; and a guidance display control unit configured to control a display device such that the guidance is displayed at the guidance position determined by the guidance position determination unit.

9. A queue management method in a queue management device, the method comprising:

a queue detection step of detecting a state of a queue based on a detection result of a queue formation element at a site subject to queue management;

a guidance position determination step of determining a guidance position where a guidance is to be displayed, based on a position at an end of the queue that is specified based on the state of the queue detected by the queue detection step, wherein the guidance position determination step comprises:

setting a queue formation area, which is a range of sites where a queue should be formed when the queue detected by the queue detection unit is further extended;

determining a route of the queue to be formed when further extending the queue in the queue formation area which has been set; and defining a position to be lined up following the position at the end of the queue as the guidance position determined based on the route which has been determined; and a guidance display control step of controlling a display device such that the guidance is displayed at the guidance position determined by the guidance position determination step.

10. A computer program product, the computer program product comprising a non-transitory computer-readable storage medium having computer readable program code embodied thereon for causing a computer to function as:

a queue detection unit that detects a state of a queue based on a detection result of a queue formation element at a site subject to queue management;

a guidance position determination unit that determines a guidance position where a guidance is to be displayed, based on a position at an end of the queue that is specified based on the state of the queue detected by the queue detection unit, wherein the guidance position determination unit is configured to set a queue formation area, which is a range of sites where a queue should be formed when the queue detected by the queue detection unit is further extended;

determine a route of the queue to be formed when further extending the queue in the queue formation area which has been set; and define a position to be lined up following the position at the end of the queue as the guidance position determined based on the route which has been determined; and a guidance display control unit that controls a display device such that the guidance is displayed at the guidance position determined by the guidance position determination unit.

\* \* \* \* \*